United States Patent
Kim

(10) Patent No.: US 10,534,079 B2
(45) Date of Patent: Jan. 14, 2020

(54) VEHICLE AND CONTROLLING METHOD THEREOF INTEGRATING RADAR AND LIDAR

(71) Applicant: Hyundai Motor Company, Seoul (KR)

(72) Inventor: Byoungkwang Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 263 days.

(21) Appl. No.: 15/212,418

(22) Filed: Jul. 18, 2016

(65) Prior Publication Data
US 2017/0248693 A1    Aug. 31, 2017

(30) Foreign Application Priority Data

Feb. 26, 2016    (KR) .......................... 10-2016-0023051

(51) Int. Cl.
| | |
|---|---|
| *G01S 13/86* | (2006.01) |
| *G01S 17/93* | (2006.01) |
| *G01S 17/42* | (2006.01) |
| *G01S 13/42* | (2006.01) |
| *G01S 17/02* | (2006.01) |

(Continued)

(52) U.S. Cl.
CPC ............ *G01S 13/865* (2013.01); *G01S 13/42* (2013.01); *G01S 13/931* (2013.01); *G01S 17/023* (2013.01); *G01S 17/42* (2013.01); *G01S 17/936* (2013.01); *G01S 2013/9367* (2013.01); *G01S 2013/9389* (2013.01)

(58) Field of Classification Search
CPC combination set(s) only.
See application file for complete search history.

(56) References Cited

U.S. PATENT DOCUMENTS 5,005,147 A * 4/1991 Krishen ................ G01S 13/867
703/13
5,471,214 A * 11/1995 Faibish ................. G01S 13/931
342/54

(Continued)

FOREIGN PATENT DOCUMENTS

| JP | 2010-156567 A | 7/2010 |
|---|---|---|
| JP | 2013-228259 A | 11/2013 |

(Continued)

OTHER PUBLICATIONS

H. Cho et al., "A Multi-Sensor Fusion System for Moving Object Detection and Tracking in Urban Driving Environments"; Proceedings of the 2014 IEEE International Conference on Robotics & Automation (ICRA); pp. 1836-1843; IEEE; Piscataway, NJ, USA; Year 2014; Publication 978-1-4799-3865-4/14/ $31.00. (Year: 2014).*

(Continued)

*Primary Examiner* — Bernarr E Gregory
(74) *Attorney, Agent, or Firm* — Mintz Levin Cohn Ferris Glovsky and Popeo, P.C.; Peter F. Corless

(57) ABSTRACT

A vehicle includes a Radar sensor configured to output Radar dot data with respect to an obstacle, a Lidar sensor configured to output Lidar dot data with respect to the obstacle, and a controller configured to match the Radar dot data to the Lidar dot data. The controller clusters one or more Lidar dots of the Lidar dot data, and clusters one or more Radar dots of the Radar dot data based on a distance between a cluster of Lidar dots and the one or more Radar dots.

17 Claims, 13 Drawing Sheets

(51) Int. Cl.
*G01S 13/93* (2006.01)
*G01S 13/00* (2006.01)
*G01S 17/00* (2006.01)

(56) References Cited

U.S. PATENT DOCUMENTS

| | | | | |
|---|---|---|---|---|
| 5,574,463 | A * | 11/1996 | Shirai | G01S 17/936 342/115 |
| 5,850,625 | A * | 12/1998 | Maren | G01S 13/86 702/93 |
| 5,963,653 | A * | 10/1999 | McNary | G01S 7/417 342/109 |
| 6,037,860 | A * | 3/2000 | Zander | G01S 13/931 307/10.1 |
| 6,650,984 | B1 * | 11/2003 | Rao | B60R 21/013 342/42 |
| 6,999,896 | B2 * | 2/2006 | Takahashi | G01S 13/931 342/450 |
| 7,142,150 | B2 * | 11/2006 | Thackray | G01S 13/865 342/54 |
| 8,311,695 | B2 * | 11/2012 | McKitterick | G01S 13/723 701/23 |
| 8,838,322 | B1 * | 9/2014 | Zhu | G01S 17/936 342/71 |
| 8,989,944 | B1 * | 3/2015 | Agarwal | G01S 17/936 340/425.5 |
| 9,014,903 | B1 * | 4/2015 | Zhu | G01S 13/931 382/103 |
| 9,097,800 | B1 * | 8/2015 | Zhu | G01S 13/865 |
| 9,921,307 | B2 * | 3/2018 | Schmalenberg | G01S 13/865 |
| 2003/0060956 | A1 * | 3/2003 | Rao | B60R 21/013 701/45 |
| 2003/0060980 | A1 * | 3/2003 | Prakah-Asante | B60R 21/013 701/301 |
| 2006/0125680 | A1 * | 6/2006 | Thackray | G01S 7/41 342/54 |
| 2007/0152804 | A1 * | 7/2007 | Breed | G01S 13/931 340/435 |
| 2008/0150786 | A1 * | 6/2008 | Breed | G01S 13/931 342/53 |
| 2009/0040095 | A1 * | 2/2009 | Ogawa | G01S 7/487 342/70 |
| 2013/0242284 | A1 | 9/2013 | Zeng | |
| 2016/0084944 | A1 * | 3/2016 | Bialer | G01S 13/931 342/70 |
| 2016/0223663 | A1 * | 8/2016 | Schmalenberg | G01S 13/931 |
| 2016/0224850 | A1 * | 8/2016 | Silver | G05D 1/021 |

FOREIGN PATENT DOCUMENTS

| | | |
|---|---|---|
| JP | 2014-025925 A | 2/2014 |
| JP | 2015166732 A | 9/2015 |
| KR | 10-1293108 B1 | 8/2013 |
| KR | 10-2015-0043892 A | 4/2015 |
| KR | 2015-0091779 A | 8/2015 |
| KR | 10-1559458 B1 | 10/2015 |

OTHER PUBLICATIONS

Korean Notice of Allowance for Korean Application No. 10-2016-0023051, dated Oct. 10, 2017, English Abstract, Original South Korean Document Not Provided—Only Translation.

* cited by examiner

FIG. 8
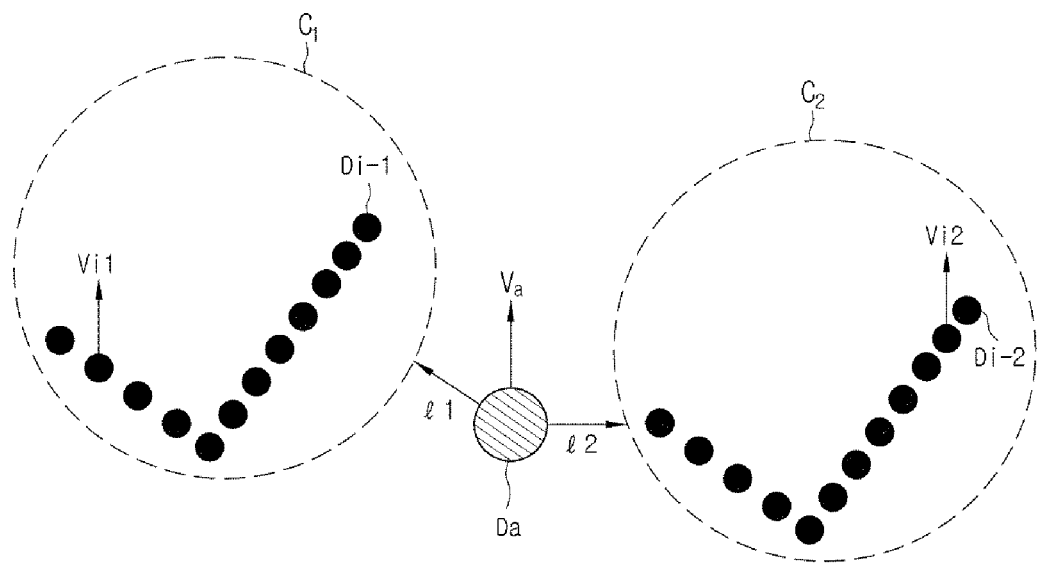
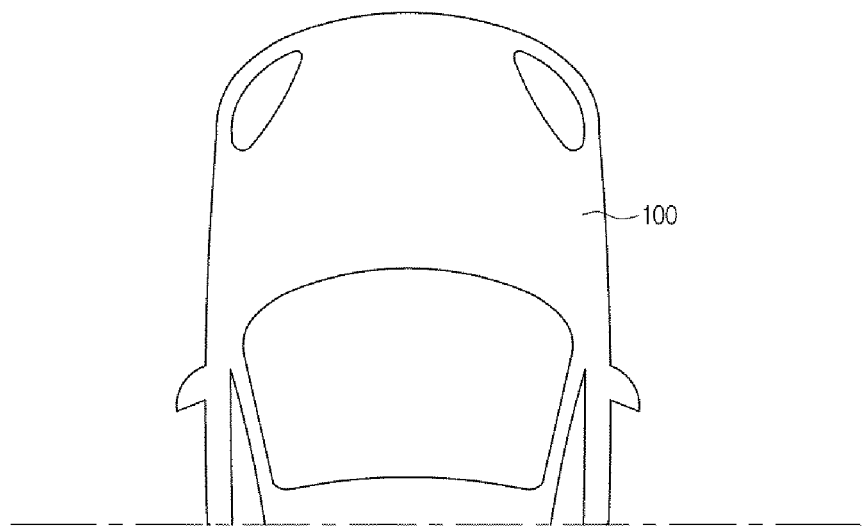

FIG. 9
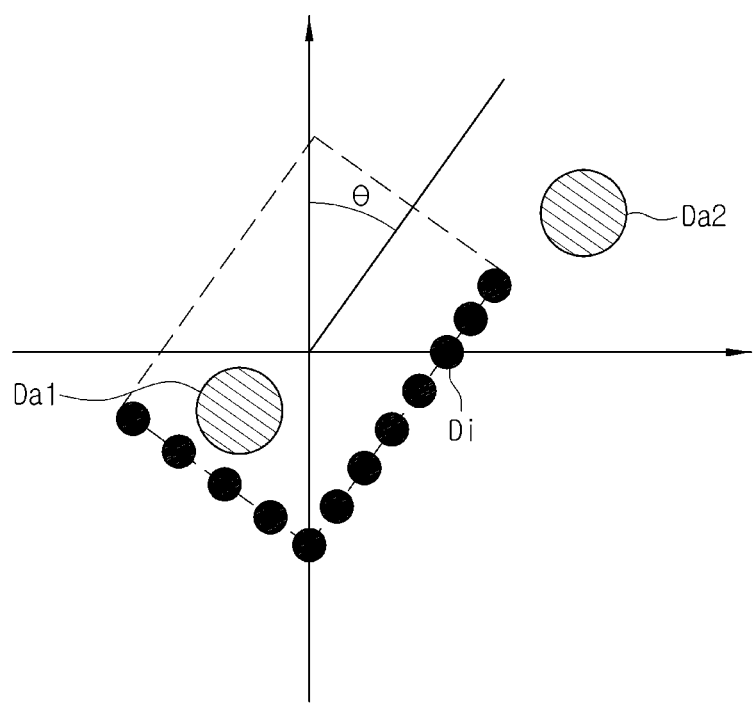
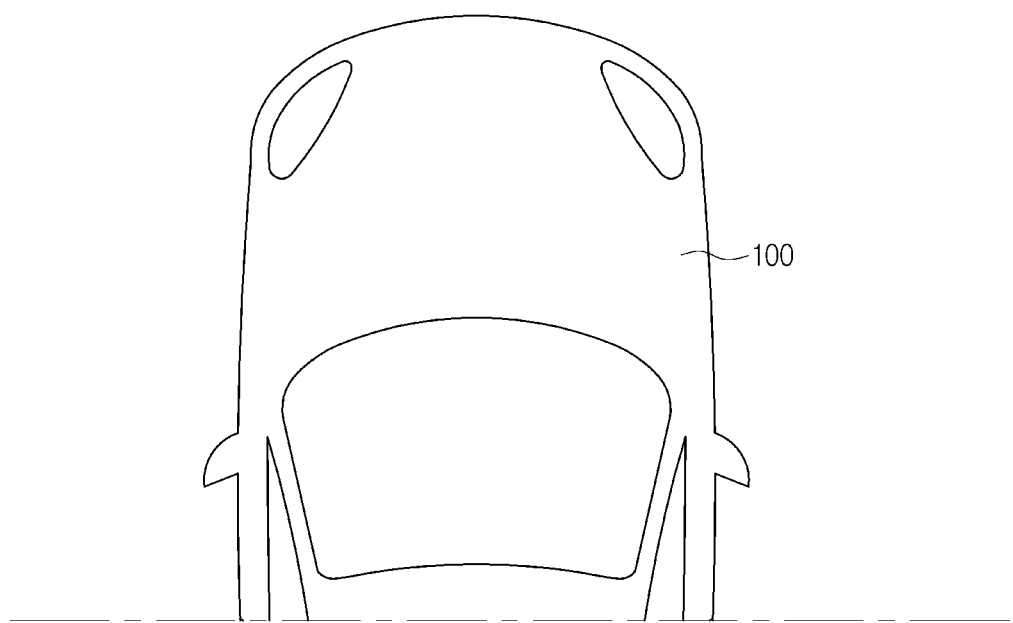

VEHICLE AND CONTROLLING METHOD THEREOF INTEGRATING RADAR AND LIDAR

CROSS-REFERENCE TO RELATED APPLICATION(S)

This application claims under 35 U.S.C. § 119(a) the benefit of Korean Patent Application No. 10-2016-0023051, filed on Feb. 26, 2016 in the Korean Intellectual Property Office, the entire contents of which are incorporated herein by reference.

BACKGROUND

1. Field of the Invention

The present invention relates to a vehicle and a method of controlling the vehicle, and more particularly, to a control method of the vehicle integrating Radar and Lidar.

2. Description of the Related Art

Many vehicle accidents are caused by driver error. For example, a collision may occur due to optical error of a driver since the driver calculates a distance from an obstacle, e.g., a vehicle ahead, based on visual information while driving. Radar systems and Lidar systems for vehicles have been developed to make up for these driver mistakes.

A Radar system and a Lidar system for a vehicle can improve safety by monitoring situations in front of the vehicle by Radar and Lidar while the vehicle is driven, issuing a warning alarm if there is a risk of collision, controlling a braking system, or fastening a seat belt, for example.

However, since conventional Radar systems and Lidar systems are independently driven, vehicles have been controlled by separately judging information from the Radar system and the Lidar system.

SUMMARY

Therefore, the present invention provides a vehicle clustering Radar dot data of a Radar sensor and Lidar dot data of a Lidar sensor by matching the Radar dot data and the Lidar dot data with each other, and a method of controlling the vehicle.

In accordance with one aspect of the present invention, a vehicle includes: a Radar sensor configured to output Radar dot data with respect to an obstacle, a Lidar sensor configured to output Lidar dot data with respect to the obstacle, and a controller configured to match the Radar dot data to the Lidar dot data, The controller clusters one or more Lidar dots of the Lidar dot data, and clusters one or more Radar dots of the Radar dot data based on a distance between a cluster of Lidar dots and the one or more Radar dots.

The controller judges a plurality of Lidar dots having a distance therebetween less than a predetermined reference interval as one cluster with respect to one obstacle.

The controller estimates an outline of the obstacle by connecting one or more Lidar dots of one cluster.

The controller estimates a smallest square comprising the outline of the obstacle as an obstacle area, and clusters the one or more Radar dots based on a distance between the obstacle area and the one or more Radar dots.

The controller sets a plurality of areas at upper, lower, left, right, and diagonal positions around the obstacle area, and estimates a perpendicular distance from the Radar dot to the obstacle area as a distance between the obstacle area and the Radar dot, if the Radar dot is found in an upper, lower, left, or right area.

The vehicle according to claim 4, wherein when the Radar dot is found in the obstacle area, the controller matches the Radar dot to a cluster corresponding to the obstacle area.

The controller estimates at least one of an outline and a velocity of the obstacle based on the clustered Radar dot data and Lidar dot data.

If there are a plurality of clusters of Lidar dots, the controller selects one cluster corresponding to a Radar dot based on at least one of a distance between each cluster and the Radar dot and a velocity difference between each cluster and the Radar dot, and judges whether the Radar dot matches the selected cluster based on a distance between the selected cluster and the Radar dot.

The controller judges a heading direction of the obstacle, and determines the number of Radar dots matching one cluster in accordance with the heading direction.

The controller determines the number of Radar dots matching one cluster in accordance with a heading direction angle.

The velocity comprises at least one of a lateral velocity and a longitudinal velocity of the obstacle.

When a cluster created by clustering one or more Radar dots comprises a plurality of Lidar dots, the controller estimates an outline of the obstacle by connecting the plurality of Lidar dots.

When the cluster created by clustering the one or more Radar dots does not include a plurality of Lidar dots, the controller estimates a predetermined area around the one or more Radar dots of the cluster as the outline of the obstacle.

The controller sets the predetermined area based on width information of the obstacle output by the Radar sensor.

In accordance with another aspect of the present invention, a method of controlling a vehicle, the method includes: outputting Radar dot data and Lidar dot data with respect to an obstacle, clustering one or more Lidar dots of the Lidar dot data, judging a distance between a cluster of the Lidar dots and one or more Radar dots of the Radar dot data, and clustering the one or more Radar dots based on the distance.

The clustering of the Lidar dots includes judging a plurality of Lidar dots having a distance therebetween less than a predetermined reference interval as a cluster with respect to one obstacle.

The judging of the distance includes: estimating an outline of the obstacle by connecting the one or more Lidar dots of one cluster, and estimating a smallest square comprising the outline of the obstacle as an obstacle area, and judging a distance between the obstacle area and the one or more Radar dots.

The judging of the distance between the obstacle area and the one or more Radar dots includes: setting a plurality of areas at upper, lower, left, right, and diagonal positions around the obstacle area, and judging a perpendicular distance between the Radar dot and the obstacle area as a distance between the obstacle area and the Radar dot, if the Radar dot is found in an upper, lower, left, or right area.

When the Radar dot is found in the obstacle area, the clustering of the one or more Radar dots includes matching the Radar dot to a cluster corresponding to the obstacle area.

The method of controlling the vehicle further includes judging a heading direction of the obstacle, and determining the number of Radar dots matching one cluster in accordance with the heading direction, before judging the distance between the cluster of the Lidar dots and the one or more Radar dots of the Radar dot data.

BRIEF DESCRIPTION OF THE DRAWINGS

These and/or other aspects of the invention will become apparent and more readily appreciated from the following description of the embodiments, taken in conjunction with the accompanying drawings of which:

FIG. 8 is a view for describing a process of judging a first matching initiation condition to select a cluster of Lidar dots to be judged on whether each Radar dot matches the cluster.

FIG. 9 is a view for describing a process of judging a second matching initiation condition to determine the number of Radar dots matching one cluster of Lidar dots.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
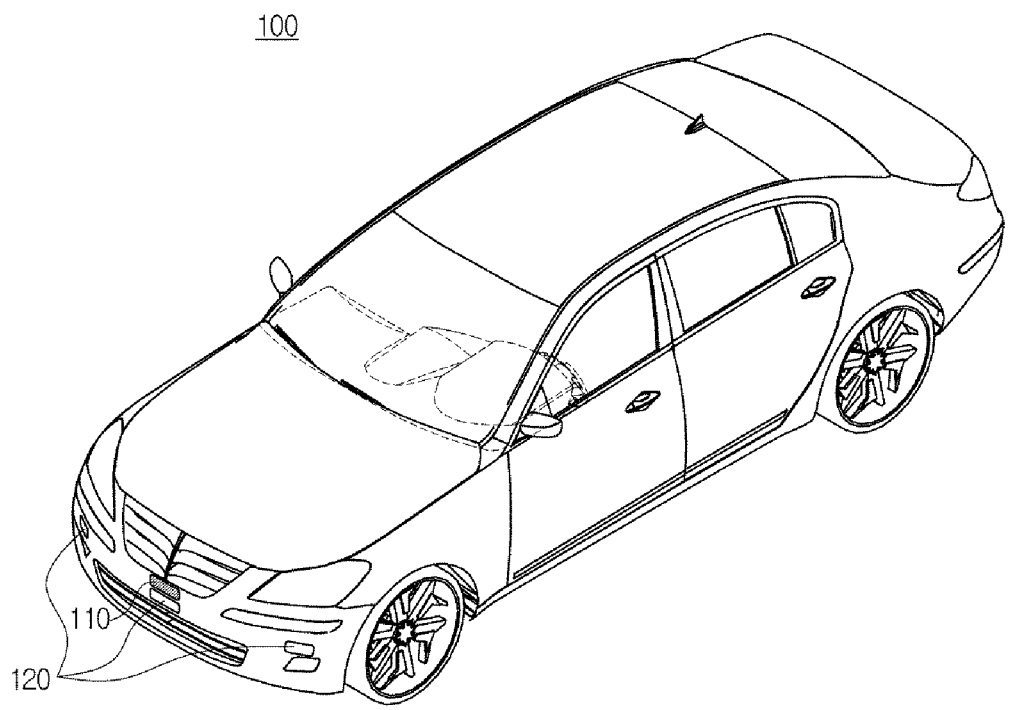
FIG. 1 is a perspective view illustrating an appearance of a vehicle according to an embodiment of the present invention.
Figure 2:
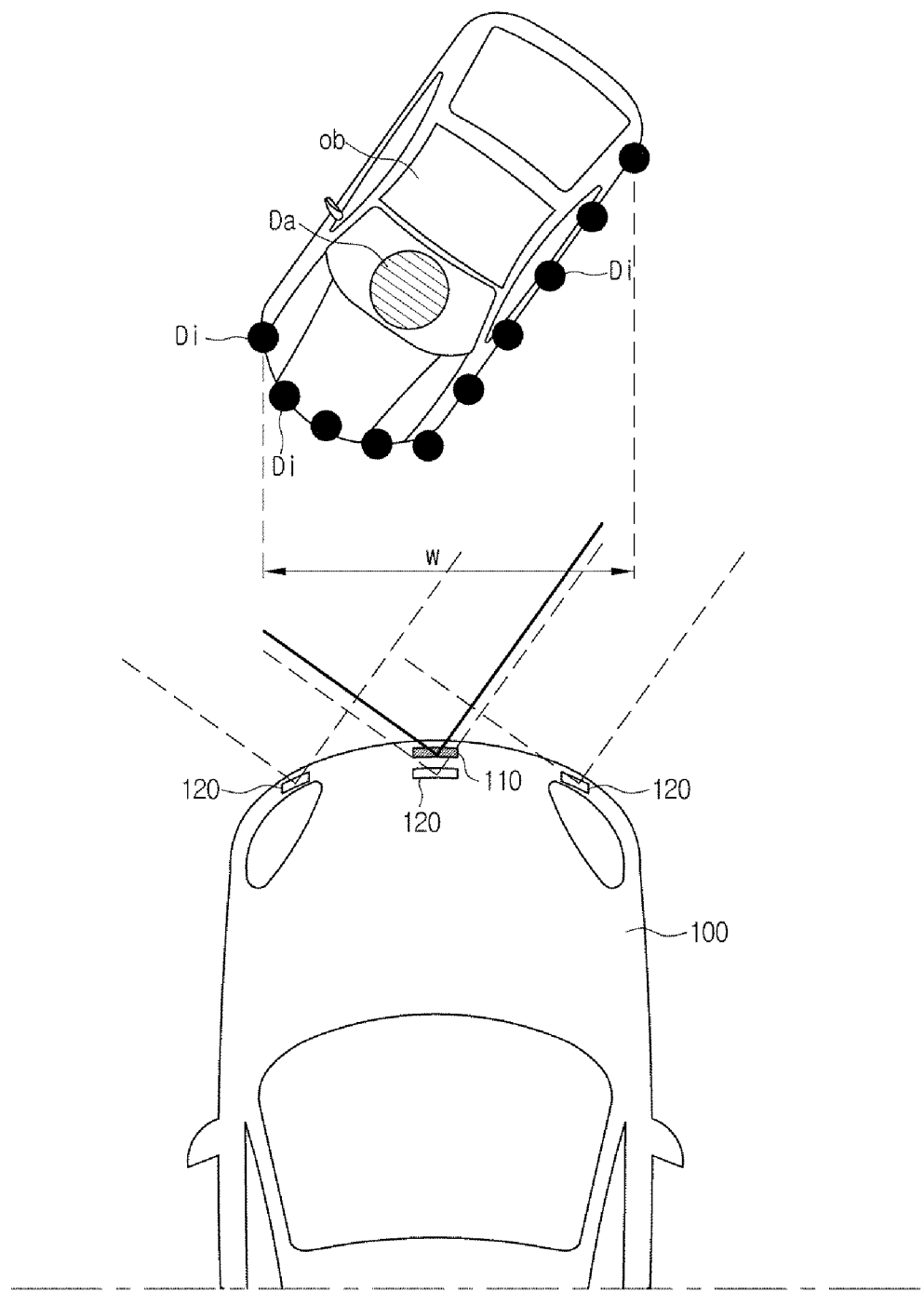
FIG. 2 is a view exemplarily illustrating sensing values output by a Radar sensor and a Lidar sensor of the vehicle.

FIG. 1 is a perspective view illustrating an appearance of a vehicle according to an embodiment of the present invention. FIG. 2 is a view exemplarily illustrating sensing values output by a Radar sensor and a Lidar sensor of the vehicle.

Referring to FIG. 1, a vehicle 100 according to an embodiment of the present invention may include a sensing device, such as a proximity sensor to sense an obstacle or another vehicle, and a rain sensor to sense whether it rains and rainfall, disposed at a front surface, a side surface, or a rear surface of the vehicle 100.

The proximity sensor includes a Radar sensor 110 and a Lidar sensor 120. If required, the vehicle 100 may include a plurality of proximity sensors. Although one Radar sensor 110 and three Lidar sensors 120 are depicted at the front surface of the vehicle 100 in FIG. 1, the location and number of the Radar sensor 110 and the Lidar sensor 120 are not limited thereto.

The Radar sensor 110 refers to a sensing device to monitor a distance from an object, a direction, an altitude, and a velocity of the object, and the like, by transmitting electromagnetic waves (e.g., radio waves or microwaves) to the object and receiving electromagnetic waves that reflect from the object. The Radar sensor 110 may include a radar antenna to transmit the electromagnetic waves or receive the electromagnetic waves reflecting from the object.

The Lidar sensor 120 refers to a sensing device to monitor a distance from an object, a direction, an altitude, and a velocity of the object, and the like, by transmitting laser beams having shorter wavelengths than electromagnetic waves (e.g., infrared light or visible light) to the object and receiving light that reflect from the object. The Lidar sensor 120 may include a light source to transmit laser beams and a receiver to receive reflected light. The Lidar sensor 120 provides better azimuth resolution and distance resolution than the Radar sensor 110.

Referring to FIG. 2, the Radar sensor 110 according to an embodiment of the present invention may output location information of an obstacle Ob in front of the vehicle 100 as dot data Da. In this case, the Radar sensor 110 may also output width information w of the obstacle Ob in addition to the location information of the obstacle Ob.

The Lidar sensor 120 according to an embodiment of the present invention may also output location information of the obstacle Ob in front of the vehicle 100 as dot data Di. Since resolution of the Lidar sensor 120 is higher than that of the Radar sensor 110, the number of dot data Di of the Lidar sensor 120 output with respect to one obstacle Ob may be greater than the number of dot data Da of the Radar sensor 110.

In addition, the Lidar sensor 120 may output dot data respectively corresponding to light beams reflecting from the entire surface of the obstacle Ob since the Lidar sensor 120 uses light.

Hereinafter, the dot data Da output by the Radar sensor 110 is referred to as Radar dot data, and the dot data Di output by the Lidar sensor 120 is referred to as Lidar dot data for descriptive convenience. Radar dot data is a data set that represents location information of the obstacle Ob output by the Radar sensor 110 at a certain time using one or more dots. Lidar dot data is a data set that represents location information of the obstacle Ob output by the Lidar sensor 120 at a certain time one or more dots. The one or more dots contained in the Radar dot data are referred to as Radar dots, and the one or more dots contained in the Lidar dot data are referred to as Lidar dots.

Figure 3:
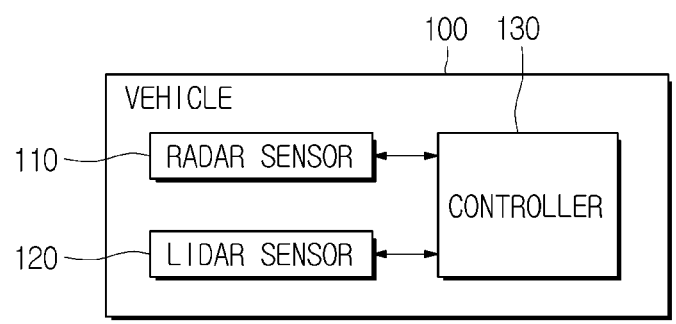
FIG. 3 is a control block diagram of the vehicle according to an embodiment of the present invention.

FIG. 3 is a control block diagram of the vehicle according to an embodiment of the present invention.

Referring to FIG. 3, the vehicle 100 includes the Radar sensor 110, the Lidar sensor 120, and a controller 130.

The Radar sensor 110 outputs a location (i.e., Radar dot data Da), a velocity, and a width w of the obstacle, and the like, as sensing values using electromagnetic waves as described above. The velocity includes a longitudinal velocity and a lateral velocity of the obstacle located in front of the vehicle 100 and the width w include a lateral length of the obstacle Ob in front of the vehicle 100.

The Lidar sensor 120 outputs a location (i.e., Lidar dot data Di) and a velocity of the obstacle, and the like, as sensing values as described above. Here, the velocity also includes a longitudinal velocity and a lateral velocity of the obstacle Ob located in front of the vehicle 100.

The controller 130 receives sensing values of the Radar sensor 110 and the Lidar sensor 120 and point clusters the Radar dot data and Lidar dot data. In addition, the controller 130 estimates an outline or velocity of the obstacle based on the Radar dot data and Lidar dot data. A process of performing point clustering of Lidar dot data and Radar dot data and estimating the outline or velocity by the controller 130 will be described later in more detail.

The controller 130 may include a memory to store programs and data and a processor to perform point clustering and estimate the outline or velocity by using the programs and data stored in the memory.

Hereinafter, a process of performing point clustering based on the Radar dot data and Lidar dot data by the controller 130 according to an embodiment of the present invention will be described with reference to FIGS. 4 to 7.

Figure 4:
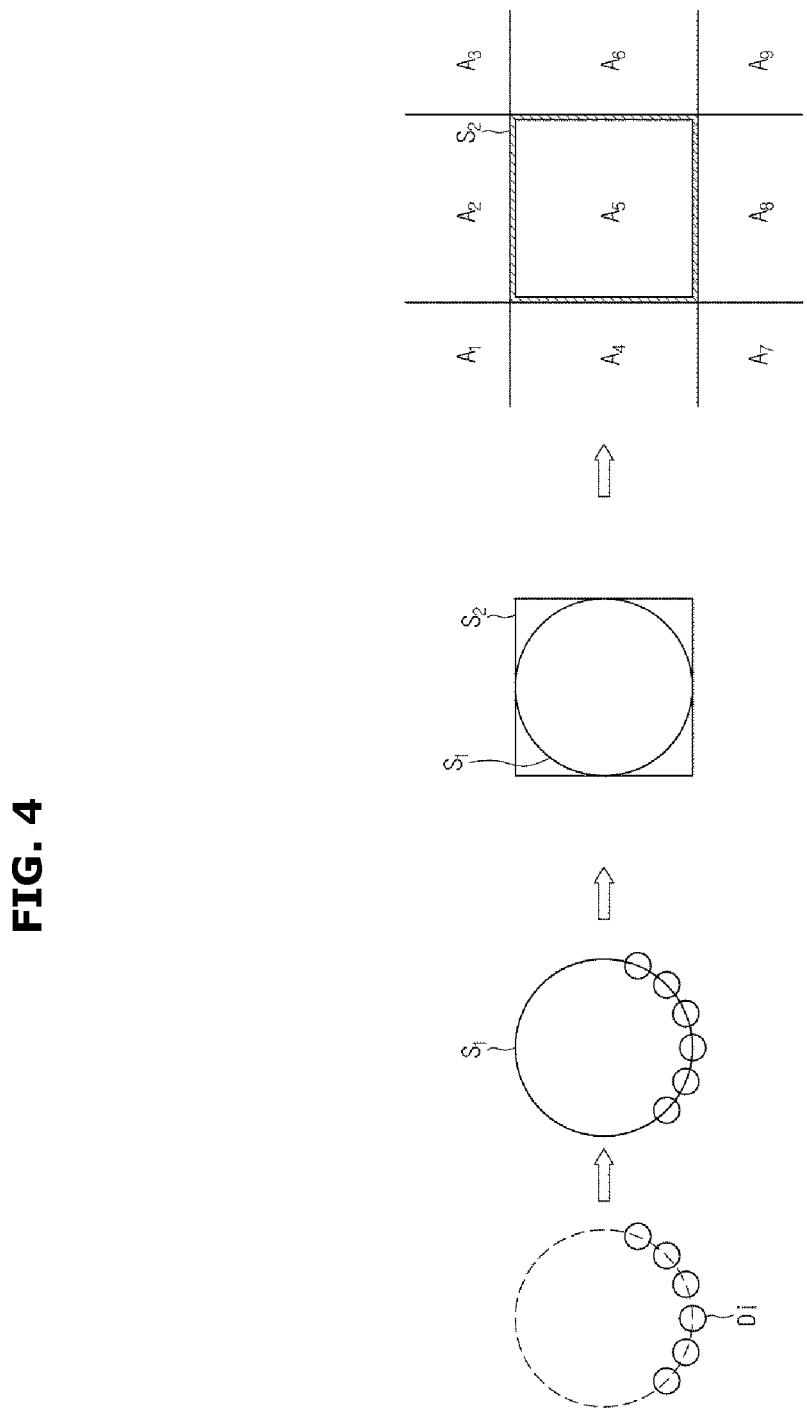
FIG. 4 is a schematic view sequentially illustrating a process of point clustering of Lidar dot data.
Figure 5:
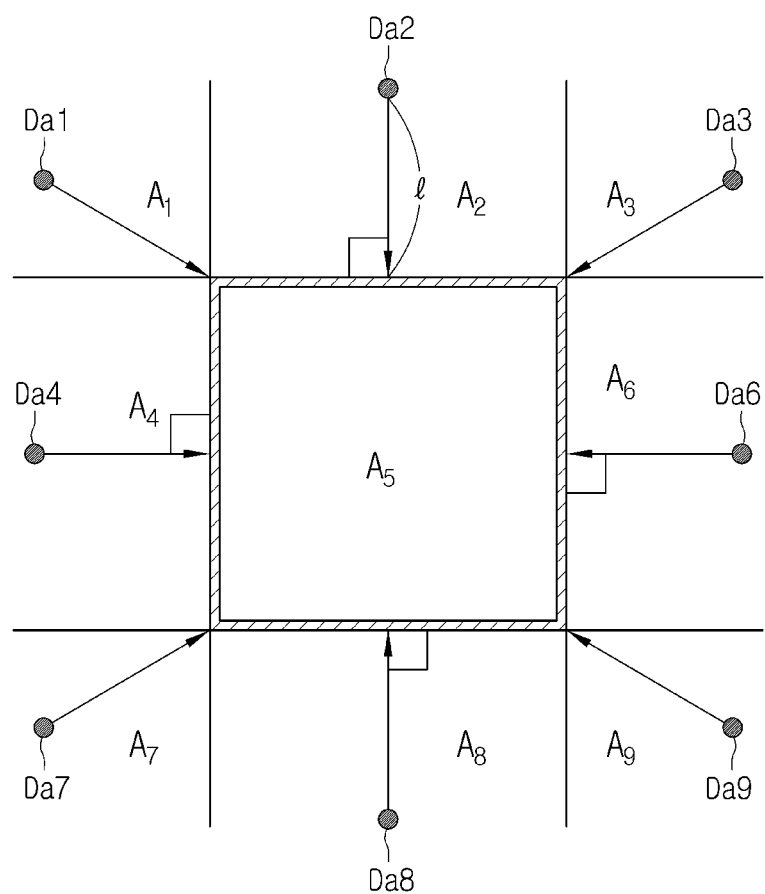
FIGS. 5 and 6 are schematic views illustrating point clustering of Radar dot data.
Figure 6:
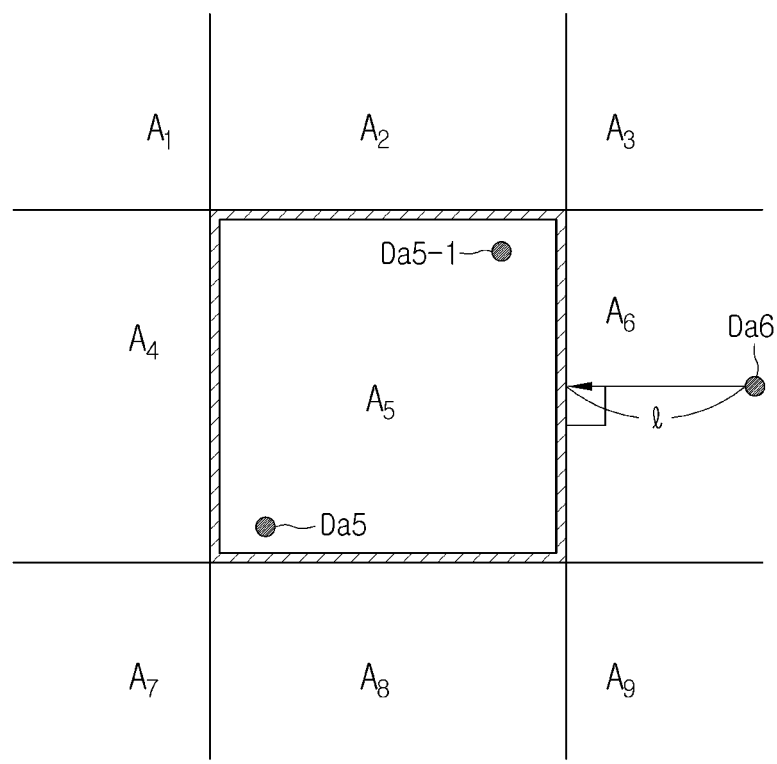
Figure 7:
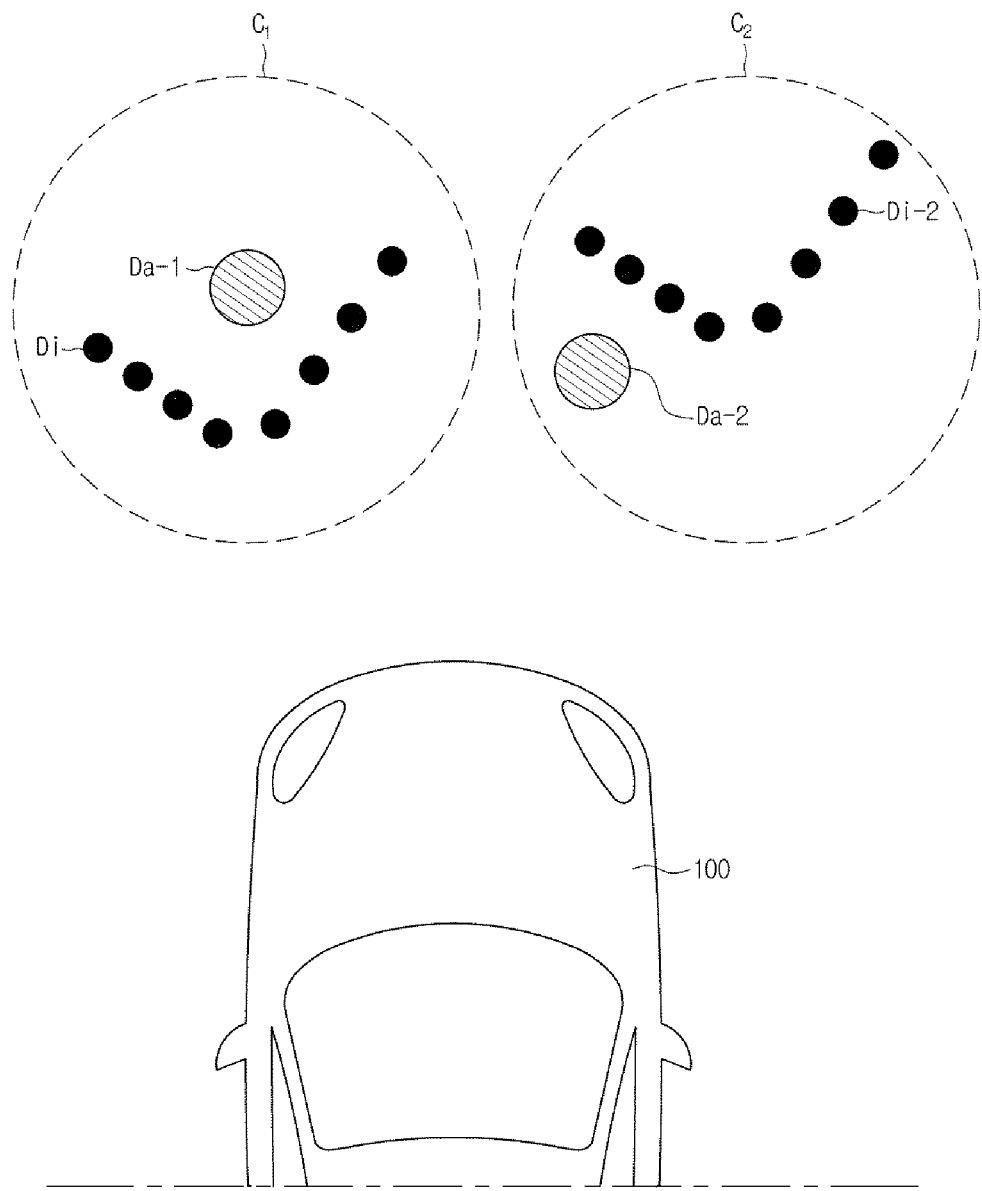
FIG. 7 is a view exemplarily illustrating a plurality of clusters obtained by point clustering of the Lidar dot data and point clustering of the Radar dot data.

FIG. 4 is a schematic view sequentially illustrating a process of point clustering of Lidar dot data. FIGS. 5 and 6 are schematic views illustrating point clustering of Radar dot data. FIG. 7 is a view exemplarily illustrating a plurality of clusters obtained by point clustering of the Lidar dot data and point clustering of the Radar dot data.

Referring to FIG. 4, the controller 130 according to an embodiment of the present invention may judge Lidar dots Di having a distance therebetween less than a predetermined reference interval as one cluster of an obstacle, and estimate an outline S1 of the obstacle by connecting the Lidar dots Di belonging to the cluster. Then, the controller 130 may create a smallest square S2 including the outline S1 of the obstacle, and estimate the square S2 as an obstacle area A5.

The controller 130 creates areas A1-A4 and A6-A9 at upper, lower, left, right, diagonal positions around the obstacle area A5.

Referring to FIG. 5, the controller 130 clusters one or more Radar dots Da1-Da4 and Da6-Da9 in accordance with one or more areas A1-A4 and A6-A9 in which Radar dots Da are found around the obstacle area A5, and distance 1 between each of the Radar dots Da1-Da4 and Da6-Da9 and the obstacle area A5.

Particularly, when Radar dots Da2, Da8, Da4, and Da6 are found in the upper, lower, left, and right areas A2, A8, A4, and A6 of the obstacle area A5, the controller 130 calculates a perpendicular distance 1 from each of the Radar dots Da2, Da8, Da4, and Da6 to the obstacle area A5.

However, when Radar dots Da1, Da3, Da1, and Da9 are found in the diagonal areas A1, A3, A7, and A9 of the obstacle area A5, the controller 130 calculates a distance 1 from each of the Radar dots Da1, Da3, Da1, and Da9 to a closest vertex of the obstacle area A5.

Then, the controller 130 matches a dot located at a closest distance 1 from the obstacle area A5 (e.g., Da2), among the Radar dots Da1-Da4 and Da5-Da9 of the upper, lower, left, right, and diagonal areas A1-A4 and A6-A9, to the obstacle area A5, thereby clustering the Radar dot Da2.

Alternatively, the controller 130 may match one or more Radar dots (e.g., Da1 and Da2) having a distance 1 from the obstacle area A5 less than the predetermined reference interval, to the obstacle area A5 among the one or more Radar dots Da1-Da4 and Da5-Da9.

Meanwhile, referring to FIG. 6, when the Radar dot Da5 is located in the obstacle area A5, the controller 130 matches the Radar dot Da5 found in the obstacle area A5 to the obstacle area A5 regardless of the distance between the Radar dot Da5 and the obstacle area A5.

For example, when the Radar dot Da6 is sensed in the right area A6, and the Radar dot Da5 is sensed in the obstacle area A5, the controller 130 may match the Radar dot Da5 located in the obstacle area A5 to the obstacle area A5 regardless of the distance 1 therebetween.

In addition, when a plurality of Radar dots Da5 and Da5-1 are found in the obstacle area A5, the controller 130 may match both of the Radar dots Da5 and Da5-1 to the obstacle area A5.

When the controller 130 clusters Lidar dot data and Radar dot data as described above, clusters C1 and C2 including both Lidar dot data and Radar dot data respectively corresponding to a plurality of obstacles may be created as illustrated in FIG. 7.

The controller 130 may estimate the outline, velocity, and the like of the obstacle based on the Radar dot data Da-1 and Da-2 and the Lidar dot data Di-1 and Di-2 of the clusters C1 and C2.

Meanwhile, although a method of matching Radar dots to a cluster of Lidar dots is described above according to the previous embodiment, a plurality of clusters of Lidar dots may be created according to distance between the Lidar dots. In this case, a process of judging a first matching initiation condition to select a cluster of Lidar dots to be judged on whether each Radar dot matches the cluster needs to be performed before judging whether the Radar dot matches the cluster.

Thus, a controller 130 according to another embodiment of the present invention may perform a process of judging the first matching initiation condition before point clustering of Radar dots. FIG. 8 is a view for describing a process of judging a first matching initiation condition to select a cluster of Lidar dots to be judged on whether each Radar dot matches the cluster.

Referring to FIG. 8, the controller 130 may judge the first matching initiation condition by judging whether Lidar dots Di-1 and Di-2 constitute a plurality of clusters C1 and C2, and selecting a cluster of Lidar dots to be judged on whether each Radar dot Da matches the cluster based on at least one of i) distances 11 and 12 between each of the clusters C1 and C2, which are respectively created using the Lidar dots Di-1 and Di-2, and the Radar dot Da and ii) differences between each of the longitudinal velocities Vi1 and Vi2 of the clusters C1 and C2, which are respectively created using the Lidar dots Di-1 and Di-2, and a longitudinal velocity Va of the Radar dot Da, if the plurality of clusters C1 and C2 is created.

For example, the controller 130 may select one cluster closest to the Radar dot Da (smallest distance 11 or 12) out of the plurality of clusters C1 and C2.

The distance 11 between the cluster C1 and the Radar dot Da and the distance 12 between the cluster C2 and the Radar dot Da may be a distance 12 between any one Lidar dot Di-1 contained in the cluster C1 and the Radar dot Da and a distance 12 between any one Lidar dot Di-2 contained in the cluster C2 and the Radar dot Da, respectively.

In addition, the controller 130 may select one cluster having a longitudinal velocity Vi1 or Vi2 similar to that of the Radar dot Da out of the plurality of clusters C1 and C2.

The longitudinal velocity Vi1 of the cluster C1 and the longitudinal velocity Vi2 of the cluster C2 may be a longitudinal velocity Vi1 of any one Lidar dot Di-1 contained in the cluster C1 and a longitudinal velocity Vi2 of any one Lidar dot Di-2 contained in the cluster C2, respectively. The longitudinal velocities Vi1 and Vi2 may be measured as location changes of the Lidar dots Di-1 and Di-2 with time. The longitudinal velocity of the Radar dot Da may also be measured as a location change of the Radar dot Da with time.

As another example, the controller 130 may select a cluster of Lidar dots to be judged on whether Radar dot Da matches the cluster by applying weights respectively to the distance 11 between the Radar dot Da and the cluster C1, the distance 12 between the Radar dot Da and the cluster C2, the difference between the longitudinal velocity Va and the longitudinal velocity Vi1, and the difference between the longitudinal velocity Va and the longitudinal velocity Vi2.

Particularly, the controller 130 may calculate a resultant value according to Equation 1 below and select a cluster having a lowest resultant value.

$$f = \alpha D_d + (1-\alpha) D_v \qquad \text{Equation 1}$$

In Equation 1, Dd denotes a distance between one Radar dot Da and each cluster, Dv denotes a difference of longitudinal velocity between the Radar dot Da and each cluster, and a denotes a weight. Here, a may be a value arbitrarily set during a manufacturing process or by a user's manipulation. As a increases, the resultant value f is sensitive to the distance between the Radar dot Da and the cluster.

In addition, a plurality of Radar dots may be detected with respect to one obstacle. In this case, a process of judging a second matching initiation condition to determine the number of Radar dots matching one cluster of Lidar dots needs to be performed.

Thus, the controller 130 may perform judging the second matching initiation condition before clustering the Radar dots. FIG. 9 is a view for describing a process of judging a second matching initiation condition to determine the number of Radar dots matching one cluster of Lidar dots.

Referring to FIG. 9, the controller 130 may judge a heading direction of an obstacle based on Lidar dot data, and determine the number of Radar dots Da matching one cluster of Lidar dots Di in accordance with a heading direction angle θ as the second matching initiation condition. As the controller 130 judges the heading direction of the obstacle, it may be determined whether a plurality of Radar dots Da1 and Da2 is detected for one obstacle (e.g., in case of one obstacle having a great lateral width).

Particularly, the controller 130 judges the heading direction and the heading direction angle θ of the obstacle by using information about the outline S1 (refer to FIG. 4) of the obstacle created by connecting Lidar dots Di forming one cluster or information about curvature of a driving lane of the vehicle 100.

Also, the controller 130 may differently set the number of Radar dots Da matching one cluster in accordance with the heading direction angle θ. For example, if the heading direction angle θ is 0° or greater and less than 30°, the number of Radar dots Da may be set to 1. If the heading direction angle θ is 30° or greater and less than 60°, the number of Radar dots Da may be set to 2. If the heading direction angle θ is 60° or greater and less than 90°, the number of Radar dots Da may be set to 3.

Meanwhile, the judging of the first matching initiation condition and the judging of the second matching initiation condition may be dispensed with. The controller 130 may perform a process of clustering Radar dot data (i.e., a process of matching Radar dots to the cluster of Lidar dots) after judging at least one of the first matching initiation condition and the second matching initiation condition.

In addition, when the process of clustering Lidar dot data and Radar dot data is completed, the controller 130 may estimate an outline, a velocity, and the like of each cluster including Lidar dot data and Radar dot data matching thereto. Hereinafter, a method of estimating the outline and velocity of the cluster will be described with reference to FIGS. 10A to 10C.

Figure 10A:
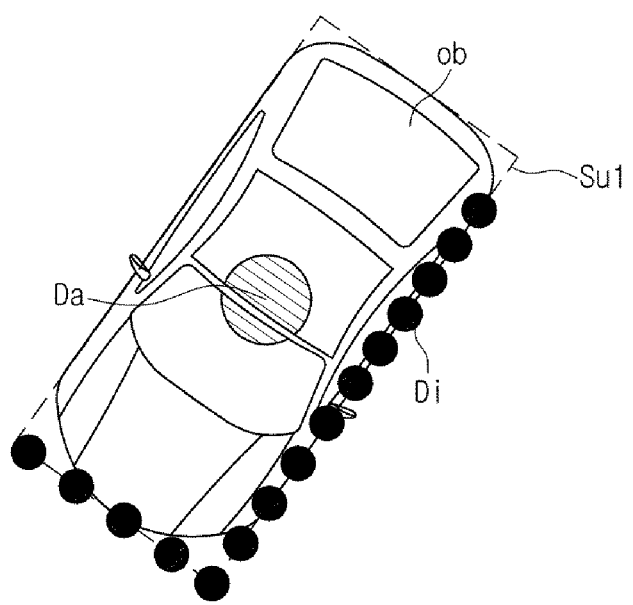
FIGS. 10A to 10C are views illustrating Radar dot data and Lidar dot data of a cluster created with respect to one obstacle.
Figure 10B:
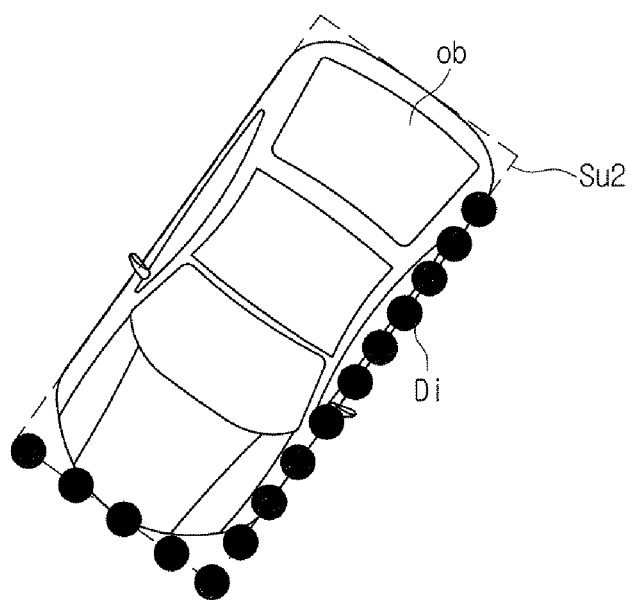
Figure 10C:
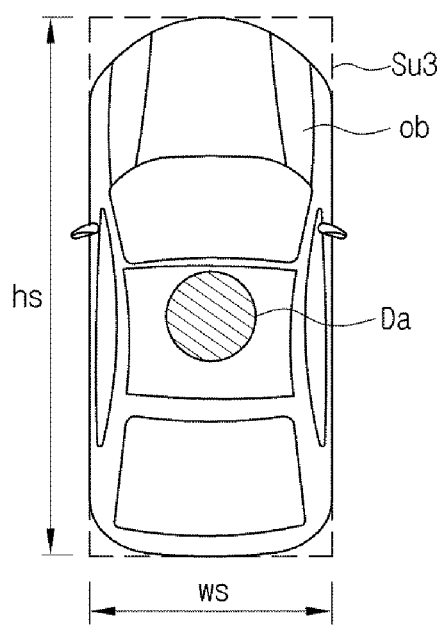

FIGS. 10A to 10C are views illustrating Radar dot data and Lidar dot data of a cluster created with respect to one obstacle.

First, when a cluster created with respect to one obstacle Ob includes both of Radar dot data Da and Lidar dot data Di as illustrated in FIG. 10A, the controller 130 may estimate an outline Su1 of the obstacle Ob based on the Lidar dot data Di. In this case, the controller 130 may estimate the outline Su1 of the obstacle Ob by connecting Lidar dots Di contained in one cluster.

The controller 130 may calculate a lateral velocity of the obstacle Ob in front of the vehicle 100 based on location information of Lidar dots Di with time and calculate a longitudinal velocity of the obstacle Ob based on location information of Radar dots Da with time.

In addition, when a cluster created with respect to one obstacle Ob includes only Lidar dot data Di as illustrated in FIG. 10B, the controller 130 may estimate an outline Su2 of the obstacle Ob based on Lidar dot data Di. In this case, the controller 130 may also estimate the outline Su2 of the obstacle Ob by connecting Lidar dots Di contained in one cluster.

The controller 130 may calculate lateral and longitudinal velocities of the obstacle Ob based on location information of Lidar dots Di with time.

In addition, when a cluster created with respect to one obstacle Ob includes only Radar dot data Da, the controller 130 may estimate a box area having a width ws and a length hs, which are predetermined based on a Radar dot Da, as an outline Su3 of the obstacle Ob.

For example, if the predetermined width ws is 2 m and the predetermined length hs is 4 m, the controller 130 may estimate a box area having a width of 2 m and a length of 4 m around the Radar dot Da as the outline Su3 of the obstacle Ob.

The Radar sensor 110 may also output width information of the obstacle Ob as a sensing value as well as dot data. In this case, the predetermined width ws may be width information of the obstacle Ob received from the Radar sensor 110.

The controller 130 may calculate lateral and longitudinal velocities of the obstacle Ob based on location information of the Radar dot Da with time.

In case point clustering is performed by matching Radar dot data and Lidar dot data each other as described above, the vehicle 100 may judge a location of the obstacle Ob by using combined data instead of separately judging Radar dot data and Lidar dot data. Accordingly, accuracy of estimation of the outline or the velocity of the obstacle Ob may be increased.

Figure 11:
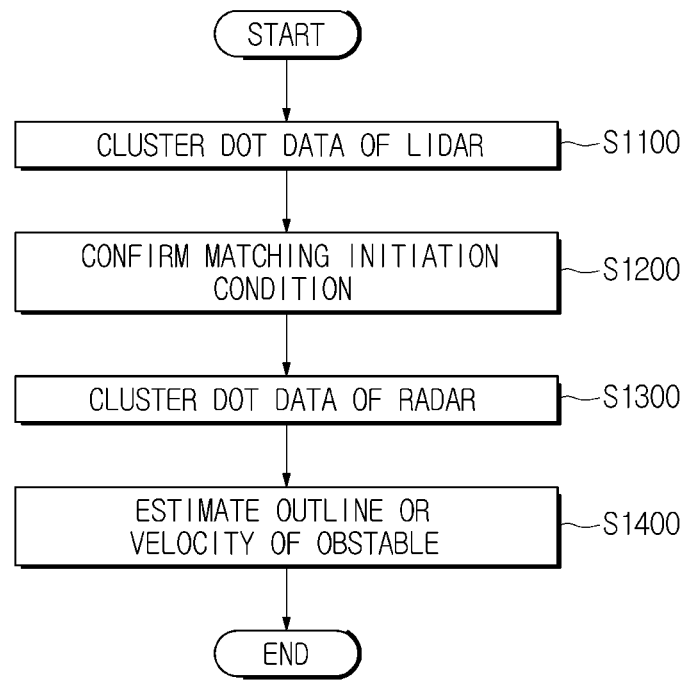
FIG. 11 is a flowchart illustrating a method of controlling the vehicle according to an embodiment of the present invention.

Hereinafter, a method of controlling the vehicle 100 including performing point clustering by matching Radar dot data and Lidar dot data each other will be described with reference to FIG. 11. FIG. 11 is a flowchart illustrating a method of controlling the vehicle according to an embodiment of the present invention. Constituent elements of the vehicle 100 described with reference to FIG. 11 are the same as those of the vehicle 100 described above with reference to FIGS. 1 to 10, and the same elements are denoted by the same reference numerals.

Before describing the method of controlling the vehicle 100, it is assumed that the Radar sensor 110 and the Lidar sensor 120 of the vehicle 100 output sensing values corresponding to each other at a certain time. The sensing value of the Radar sensor 110 includes Radar dot data and may further include width information of the obstacle Ob. The sensing value of the Lidar sensor 120 includes Lidar dot data.

First, the controller 130 of the vehicle 100 according to an embodiment of the present invention clusters one or more Lidar dots (S1100).

Particularly, the controller 130 may judge Lidar dots Di having a distance therebetween less than a predetermined reference interval as one cluster of one obstacle. Accordingly, one or more clusters including Lidar dots may be created.

Then, the controller 130 may judge a matching initiation condition before clustering Radar dot data (S1200). The judging of the matching initiation condition may include at least one of a process of judging the first matching initiation condition and the process of judging the second matching initiation condition.

Particularly, the controller 130 judges whether Lidar dots Di constitute a plurality of clusters, and selects a cluster of Lidar dots Di to be judged on whether the Radar dot Da matches the cluster, based on at least one of i) distances between each of the clusters, which are respectively created using the Lidar dots Di, and the Radar dot Da and ii) differences between each of the longitudinal velocities of the clusters, which are respectively created of the Lidar dots Di, and a longitudinal velocity of the Radar dot Da, if the plurality of clusters is created, as the process of judging the first matching initiation condition. The process of selecting the cluster to be judged on whether the Radar dot matches the cluster among a plurality of clusters is described above, and detailed descriptions thereof will not be repeated.

In addition, the controller 130 may judge a heading direction of an obstacle based on Lidar dot data and determine the number of Radar dots Da matching one cluster of Lidar dots in accordance with a heading direction angle θ, as the second matching initiation condition. The process of determining the number of Radar dots Da matching one cluster is described above, and detailed descriptions thereof will not be repeated.

Then, the controller 130 clusters one or more Radar dots (S1300).

Particularly, when the first matching initiation condition is judged, the controller 130 judges one Radar dot matching one cluster among one or more Radar dots Da selected for the cluster. In addition, the controller 130 judges the determined number of Radar dots matching when the second matching initiation condition is judged.

For example, if a first to third Radar dots Da are selected for a first cluster by judging the first matching initiation condition, and it is determined that two Radar dots Da match the first cluster by judging the second matching initiation condition, the controller 130 may judge distances between each of the first to third Radar dots Da and the obstacle area A5 and match two Radar dots (e.g., the first and second Radar dots) having the shortest distance from the obstacle area A5 to the first cluster. The process of matching Radar dot Da to the cluster is described above with reference to FIG. 4, and detailed descriptions thereof will not be repeated herein.

One or more Radar dots Da may also be clustered as they match each cluster.

Then, the controller 130 estimate an outline or velocity of the obstacle based on the clustered Radar dot data and Lidar dot data (S1400).

Particularly, when a cluster created with respect to one obstacle Ob includes both Radar dot data Da and Lidar dot data Di, the controller 130 may estimate an outline of the obstacle Ob based on the Lidar dot data Di.

In this case, the controller 130 may calculate a lateral velocity of the obstacle Ob based on location information of Lidar dot Di with time and calculate a longitudinal velocity of the obstacle Ob based on location information of Radar dot Da with time.

In addition, when a cluster created with respect to one obstacle Ob includes only Lidar dot data Di, the controller 130 may estimate an outline of the obstacle Ob based on Lidar dot data Di. In this case, the controller 130 may estimate the outline of the obstacle Ob by connecting Lidar dots Di contained in one cluster.

In addition, the controller 130 may calculate lateral and longitudinal velocities of the obstacle Ob based on location information of Lidar dots Di with time.

In addition, when a cluster created with respect to one obstacle Ob includes only Radar dot data Da, the controller 130 may estimate a box area having a width and a length, which are predetermined based on Radar dot Da, as an outline of the obstacle Ob.

Also, the Radar sensor 110 may output width information of the obstacle Ob as a sensing value as well as dot data. In this case, the predetermined width may be width information of the obstacle Ob received from the Radar sensor 110.

In addition, the controller 130 may calculate lateral and longitudinal velocities of the obstacle Ob based on location information of Radar dot Da with time.

As is apparent from the above description, according to the vehicle and the method of controlling the vehicle, the vehicle may judge location of obstacles or perform various controls using combined data instead of separately judging Radar dot data and Lidar dot data.

The foregoing description of the present invention has been presented for the purposes of illustration and description. It will be understood by those of ordinary skill in the art that the present invention may be easily modified into other detailed forms without changing the technical principle or essential features of the present invention. Therefore, the foregoing embodiments should be regarded as illustrative rather than limiting in all aspects. For example, each component which has been described as a unitary part may be implemented as distributed parts. Likewise, each component which has been described as distributed parts may be also be implemented as a combined part.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle, comprising:
a Radar sensor disposed at the vehicle configured to output Radar dot data with respect to an obstacle;
a Lidar sensor disposed at the vehicle configured to output Lidar dot data with respect to the obstacle; and
a controller configured to match the Radar dot data to the Lidar dot data,
wherein the controller clusters at least two Lidar dots of the Lidar dot data, and clusters at least two Radar dots of the Radar dot data based on a distance between a cluster of the at least two Lidar dots and the at least two Radar dots,
wherein the at least two Radar dots indicate a location point on the obstacle by the Radar sensor,
wherein the at least two Lidar dots indicate a location point on the obstacle by the Lidar sensor, and
wherein the controller estimates a boundary of the obstacle by connecting the one or more Lidar dots of one cluster and estimates a smallest square comprising an outline of the obstacle as an obstacle area, and clusters the one or more Radar dots based on a distance between the obstacle area and the one or more Radar dots.

2. The vehicle according to claim 1, wherein the controller judges a plurality of Lidar dots having a distance therebetween less than a predetermined reference interval as one cluster with respect to one obstacle.

3. The vehicle according to claim 1, wherein the controller sets a plurality of areas at upper, lower, left, right, and diagonal positions around the obstacle area, and estimates a perpendicular distance from the one or more Radar dots to the obstacle area as a distance between the obstacle area and the one or more Radar dots, if the one or more Radar dots is found in an upper, lower, left, or right area.

4. The vehicle according to claim 1, wherein when the one or more Radar dots is found in the obstacle area, the controller matches the one or more Radar dots to a cluster corresponding to the obstacle area.

5. The vehicle according to claim 1, wherein the controller estimates at least one of an outline and a velocity of the obstacle based on the clustered Radar dot data and Lidar dot data.

6. The vehicle according to claim 5, wherein the velocity comprises at least one of a lateral velocity and a longitudinal velocity of the obstacle.

7. The vehicle according to claim 5, wherein when the cluster created by clustering the one or more Radar dots comprises a plurality of Lidar dots, the controller estimates the outline of the obstacle by connecting the plurality of Lidar dots.

8. The vehicle according to claim 7, wherein when the cluster created by clustering the one or more Radar dots does not include a plurality of Lidar dots, the controller estimates a predetermined area around the one or more Radar dots of the cluster as the outline of the obstacle.

9. The vehicle according to claim 8, wherein the controller sets the predetermined area based on width information of the obstacle output by the Radar sensor.

10. The vehicle according to claim 1, wherein if there are a plurality of clusters of Lidar dots, the controller selects one cluster corresponding to the one or more Radar dots based on at least one of a distance between each cluster and the one or more Radar dots and a velocity difference between each cluster and the one or more Radar dots, and judges whether the one or more Radar dots matches the selected cluster based on a distance between the selected cluster and the one or more Radar dots.

11. The vehicle according to claim 1, wherein the controller judges a heading direction of the obstacle, and determines the number of Radar dots matching one cluster in accordance with the heading direction.

12. The vehicle according to claim 11, wherein the controller determines the number of Radar dots matching one cluster in accordance with a heading direction angle.

13. A method performed by a sensor system in a vehicle, the method comprising the steps of:
outputting Radar dot data and Lidar dot data with respect to an obstacle;
clustering at least two Lidar dots of the Lidar dot data;
judging a distance between a cluster of the at least two Lidar dots and at least two Radar dots of the Radar dot data;
wherein the step of judging the distance comprises estimating an outline of the obstacle by connecting the one or more Lidar dots of one cluster, and estimating a smallest square comprising the outline of the obstacle as an obstacle area, and judging a distance between the obstacle area and the one or more Radar dots; and
clustering the at least two Radar dots based on the distance,
wherein the at least two Radar dots indicate a location point on the obstacle by the Radar sensor, and
wherein the at least two Lidar dots indicate a location point on the obstacle by the Lidar sensor.

14. The method according to claim 13, wherein the step of clustering the Lidar dots comprises judging a plurality of Lidar dots having a distance therebetween less than a predetermined reference interval as a cluster with respect to one obstacle.

15. The method according to claim 1, wherein the step of judging the distance between the obstacle area and the one or more Radar dots comprises:
setting a plurality of areas at upper, lower, left, right, and diagonal positions around the obstacle area, and judging a perpendicular distance between the one or more Radar dots and the obstacle area as a distance between the obstacle area and the one or more Radar dots, if the one or more Radar dots is found in an upper, lower, left, or right area.

16. The method according to claim 13, wherein when the one or more Radar dots is found in the obstacle area, the clustering of the one or more Radar dots comprises matching the one or more Radar dots to a cluster corresponding to the obstacle area.

17. The method according to claim 13, further comprising judging a heading direction of the obstacle, and determining the number of Radar dots matching one cluster in accordance with the heading direction, before judging the distance between the cluster of the Lidar dots and the one or more Radar dots of the Radar dot data.

* * * * *